Feb. 20, 1923.
R. S. BLAIR.
SHUCKING VEGETABLE PRODUCT.
FILED MAY 13, 1921.
1,445,742.
5 SHEETS—SHEET 5.
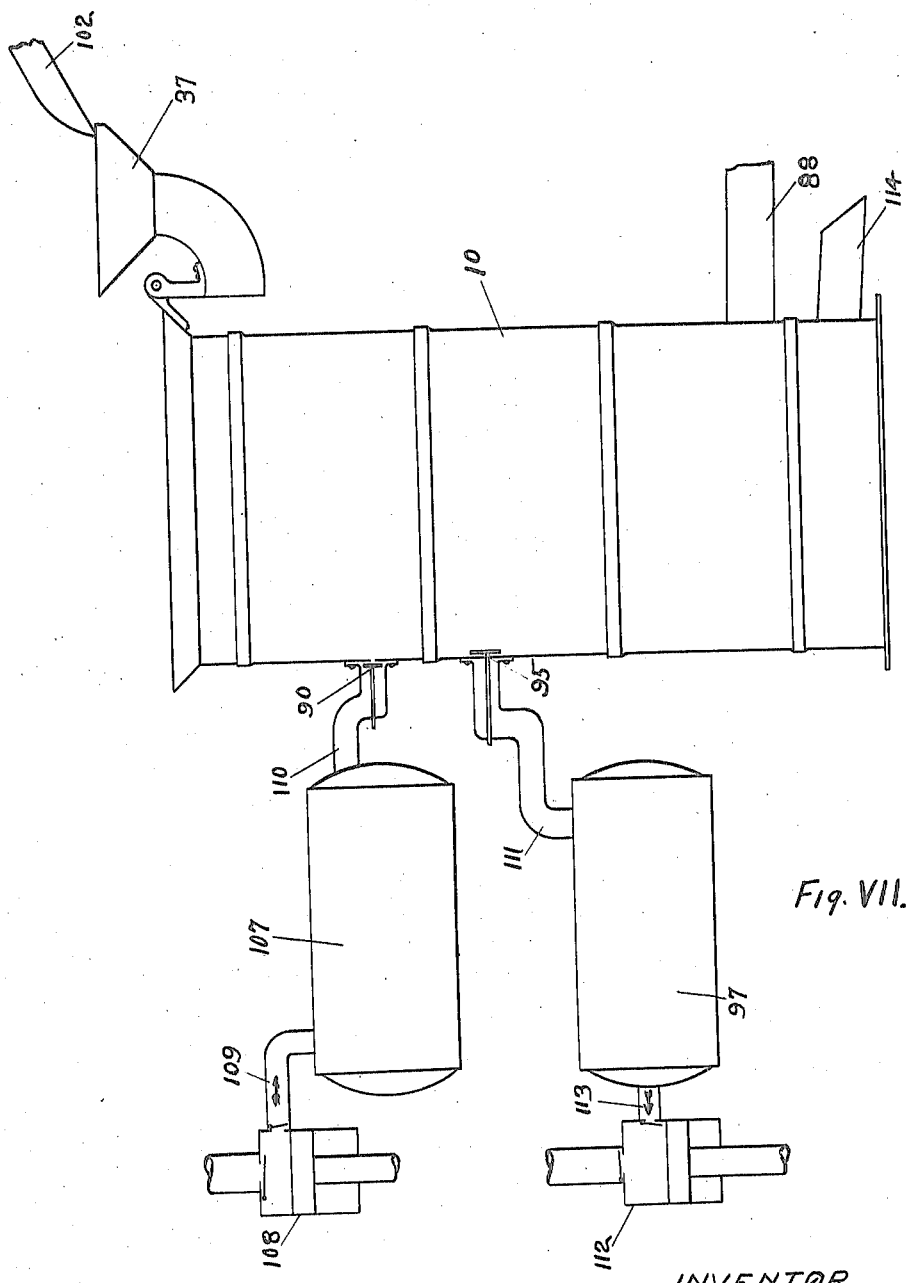
Fig. VII.
INVENTOR
Robert S. Blair Patented Feb. 20, 1923.

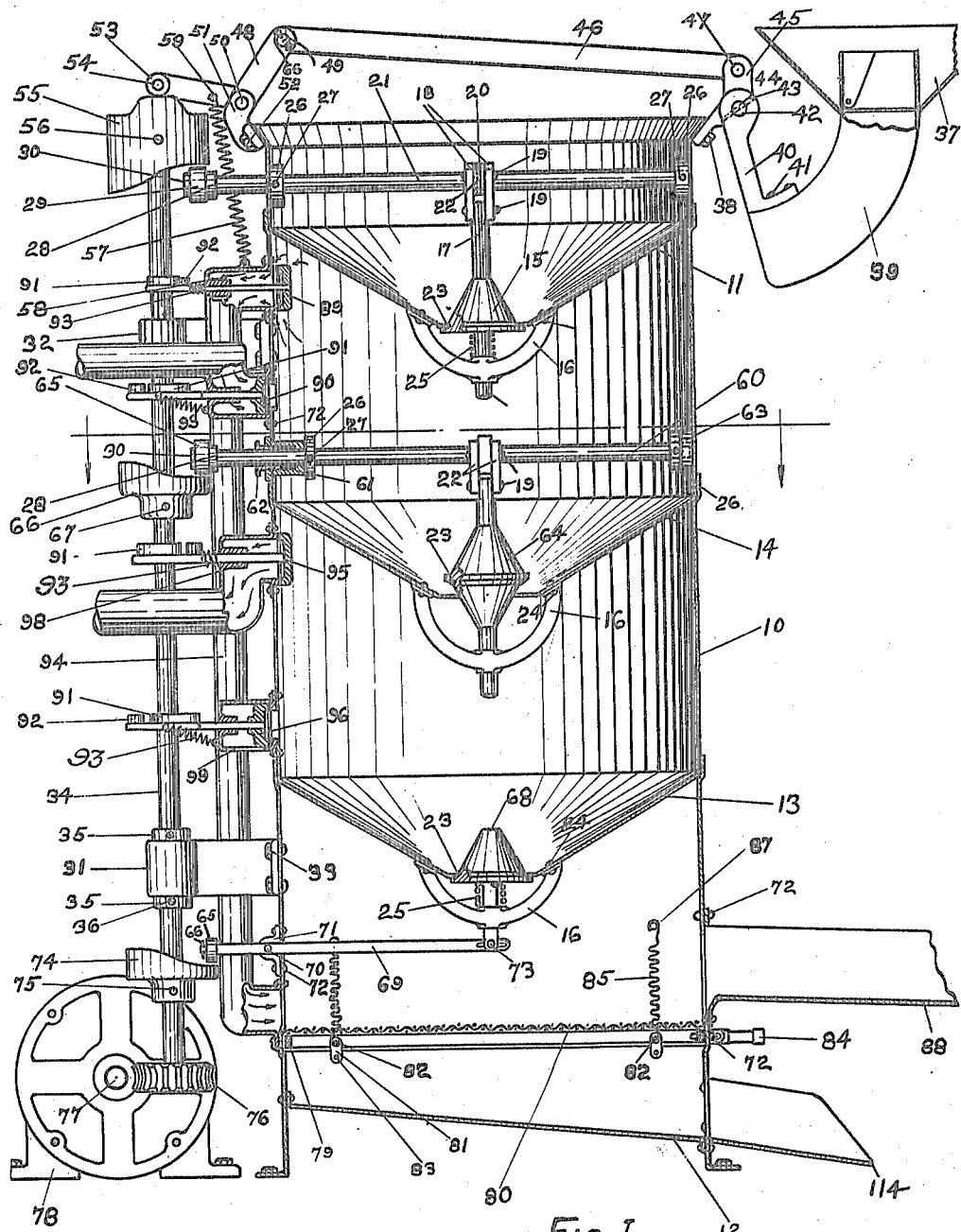

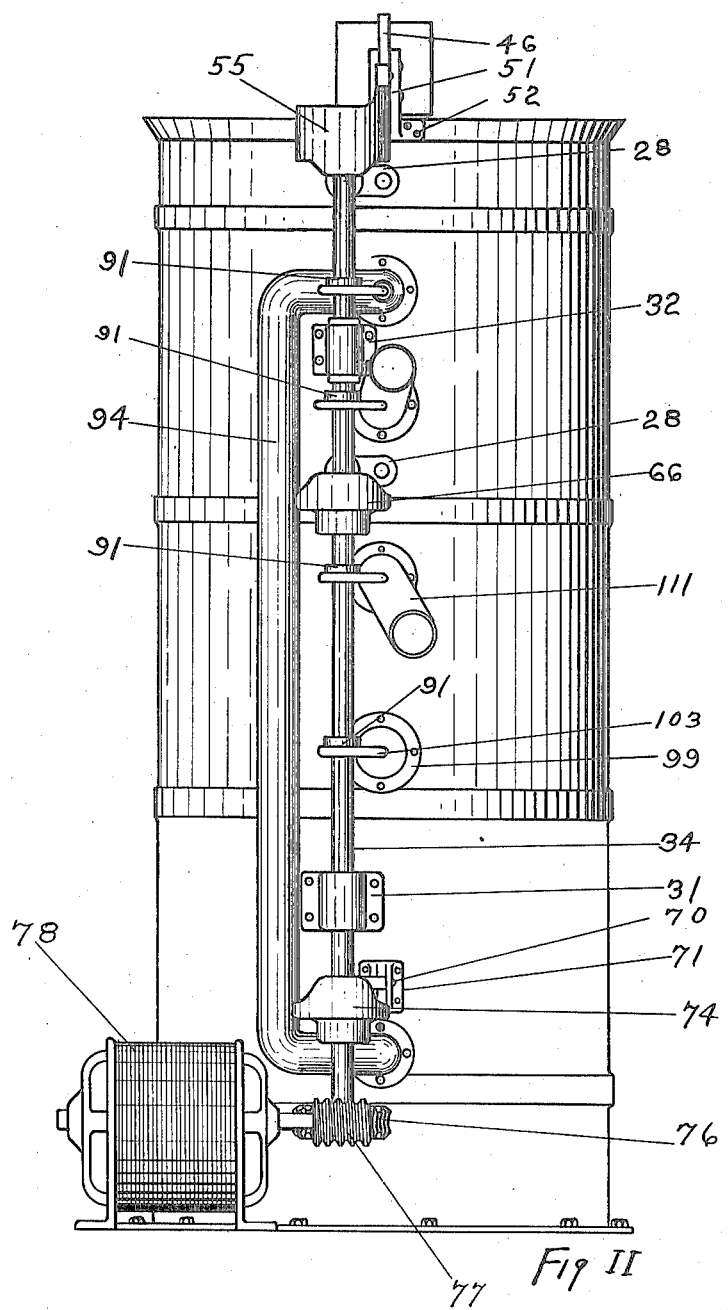

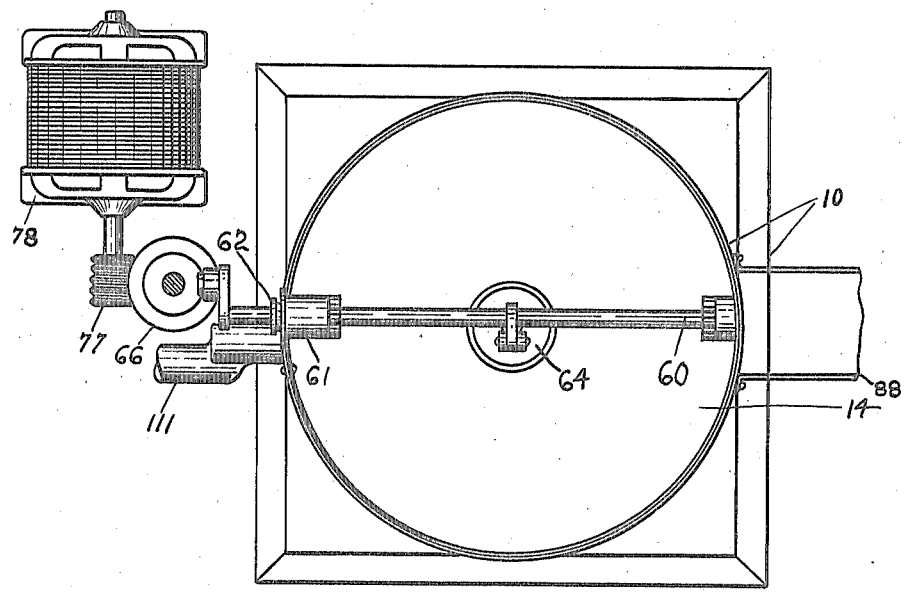

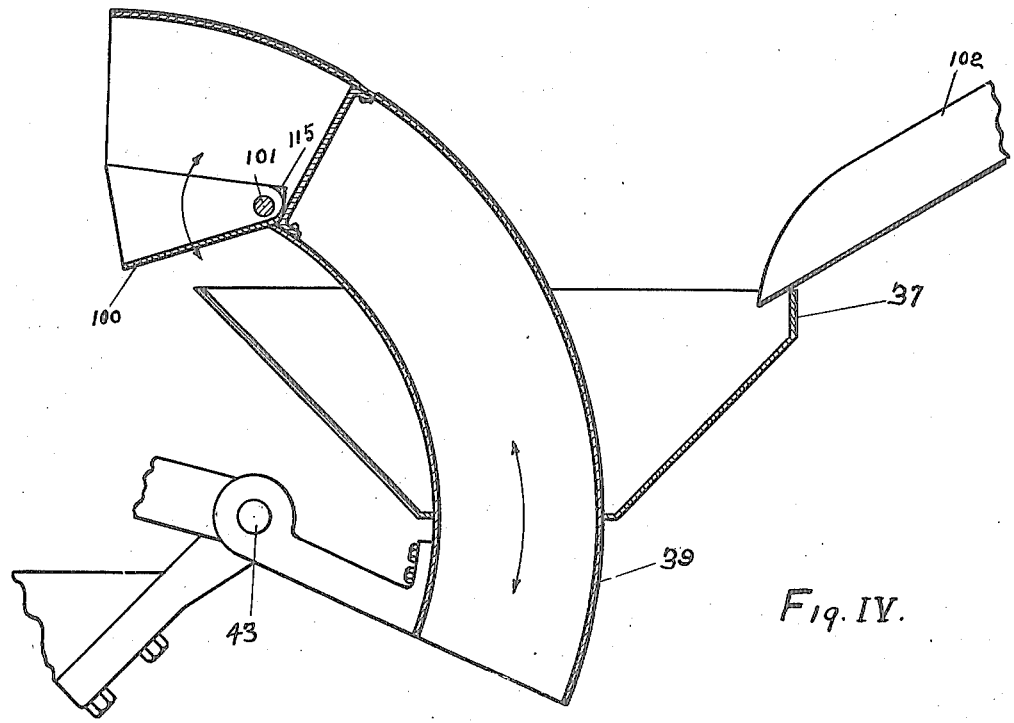
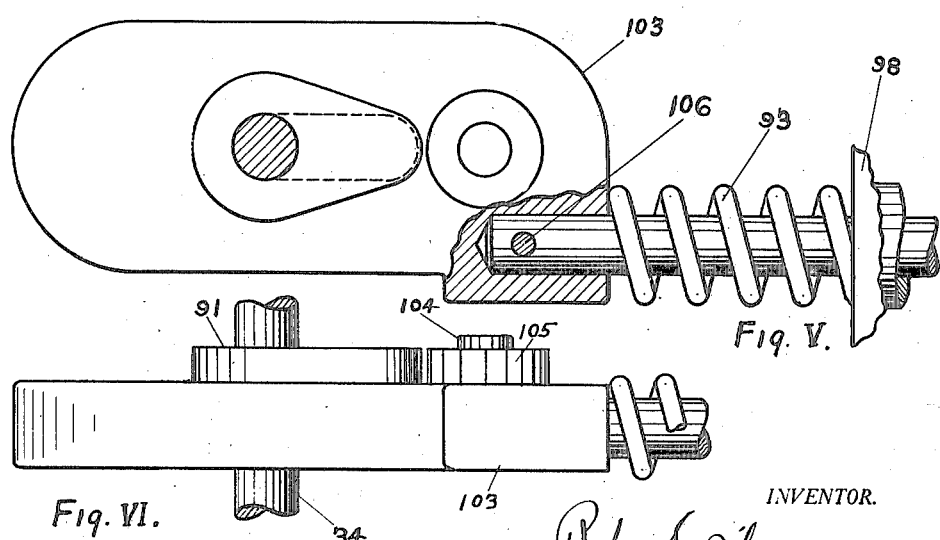

1,445,742

UNITED STATES PATENT OFFICE.

ROBERT S. BLAIR, OF SOUND BEACH, CONNECTICUT.

SHUCKING VEGETABLE PRODUCT.

Application filed May 13, 1921. Serial No. 469,134.

*To all whom it may concern:*

Be it known that I, ROBERT S. BLAIR, a citizen of the United States, and resident of Sound Beach, in the county of Fairfield and State of Connecticut, have invented certain new and useful Improvements in Shucking Vegetable Products, of which the following is a specification.

This invention relates to apparatus for the shucking of vegetable products and more particularly to removing the husks and shells from various vegetable products.

One of the objects thereof is to provide an apparatus of practical construction and simple in operation whereby the shucks of vegetable products may be removed. Another object is to provide apparatus of the above type of simple and reliable construction and automatic in operation. Another object is to provide an art of the above nature which is readily adaptable to meet the conditions imposed by removing shucks and shells from various vegetable products. Another object is to provide an apparatus adaptable to removing the shucks from various vegetable products without bruising or causing other damage to the food kernels contained therein. Other objects will be in part obvious and in part pointed out hereinafter.

The invention accordingly consists in the features of construction, combinations of elements, arrangements of parts and in the several steps and relation and order of one or more of the same with respect to one or more of the others, all as will be illustratively herein described and the scope of the application of which will be indicated in the following claims.

In the accompanying drawings in which is shown one of the various possible embodiments of the several mechanical features of this invention, Figure I is a side elevation in cross section of the apparatus for shucking vegetable products.

Figure II is a left hand view of the apparatus shown in Figure I in elevation.

Figure III is a plan view in section of the apparatus shown in Figure I, the section being taken along the line 1—1 in the direction as indicated by the arrows.

Figure IV is an enlarged view of the hopper feeding mechanism shown on the apparatus in Figure I taken in cross section as shown in Figure I and showing the end of the chute which feeds the vegetable products which are to be shucked to the hopper.

Figure V is a plan view of the valve operating mechanism used to operate the various poppet valves shown on the apparatus in Figure I.

Figure VI is a side elevation of the valve operating mechanism shown in Figure V.

Figure VII is a diagrammatic layout showing the apparatus for shucking vegetable products connected up with the various pumps which are essential for its operation.

Turning now to Figure I we have a cylindrical casing 10 provided with an upper head 11 and a lower head 12 and two intermediate partitions 13 and 14. The upper head 11 and the intermediate partitions 14 and 13 divide the upper portion of the cylindrical casing 10 up into two equal air-tight chambers. The upper head 11 is conical in form and is provided with a conical valve 15 at its apex, the upper head 11 being arranged sloping downward so as to tend to conduct any vegetable products which may be deposited therein downward to the conical valve 15. A lug 16 riveted by means of rivets such as 24 to the lower side of the upper head 11 serves as a guide for the valve stem 17, the valve stem 17 being connected at its upper end by means of a pair of links such as 18 and pins such as 19 to the bell crank 20 which is pinned on the rocking shaft 21 by the pin 22. The conical valve 15 is provided with a groove at its lower circumference wherein is set a soft gasket 23. A spiral spring 25 is mounted concentrically around the valve stem 17 and pressing against the lug 16 and the bottom of the conical valve 15 at all times tends to hold the soft gasket 23 firmly against the bottom of the upper head 11. The rocking shaft 21 passes through the walls of the cylindrical casing 10; which at those points where the rocking shaft 21 passes through serves as bearings and a pair of collars such as 26 fastened on the rocking shaft 21 by set screws such as 27 restrains the rocking shaft 21 from relative axial movement with the cylindrical casing 10. On the outer end of the rocking shaft 21 is secured a bell crank 28 on one end of which is journaled a roller 29 on the stud 30 which is screwed into the end of the bell crank 28. A pair of bearings 31 and 32 riveted to the outside surface of the cylindrical casing 10 by means of rivets such as 33 has journaled therein a vertical cam shaft 34 having fastened thereon a pair of thrust collars such as 35 by means of set screws such as 36 which thrust collars bearing against the ends of the bearing 31 prevent relative axial movement of the vertical cam shaft 34 with respect to the cylindrical casing 10 and all of the mechanism actuated by said vertical cam shaft 34. Hopper 37 bolted to the upper end of the cylindrical casing 10 by means of bolts such as 38 is provided with a feeding sector 39 which is secured to the end of the lever 40 by rivets such as 41, the lever 40 being pinned on the shaft 42 by means of the pin 43, shaft 42 being journaled in the hopper frame 37. Pinned on the other end of the shaft 42 by means of the pin 44 is the bell crank 45 to the other end of which bell crank 45 is connected link 46 by means of the pin 47, the other end of link 46 being connected to bell crank 48 by means of the pin 49, bell crank 48 being swiveled on the stud 50 which is pressed into a bracket 51 bolted on to the upper end of the cylindrical casing 10 by means of bolts such as 52. The roller 53 is journaled on stud 54 which is screwed into the end of one of the arms of the bell crank 48 and is held in rolling contact with the cam 55 which is secured on the upper end of the vertical cam shaft 34 by means of the set screw 56, spring 57 one end of which is hooked into a lug on the exhaust valve casing 58 has its upper end hooked over the stud 59 in the bell crank 48 and at all times causes the roller 53 to follow the contour of the cam 55 as it revolves. The cam 55 is a double ended cam, that is its upper surface operates the feed sector 39 of the hopper 37 while its lower surface serves as a cam which operates conical valve 15. The rocking shaft 60 passes through the left hand wall of the cylindrical casing 10 and at the point where it passes through the wall there is provided a stuffing box 61 provided with a gland 62. The other end of the rocking shaft 60 is journaled in a boss 63 on the inside surface of the cylindrical casing 10 and a pair of thrust collars such as 26 fastened to the rocking shaft 60 by set screws such as 27 prevent axial movement of the rocking shaft 60 relative to the cylindrical casing 10. The intermediate partition 14 is provided with a conical valve 64 so formed that when lowered a soft gasket such as 23 set in a groove thereon engages with the upper surface of the intermediate partition 14. The conical valve 64 is lifted from its seat by means of the roller 65 engaging with the cam 66 secured to the vertical cam shaft 34 by means of the set screw 67, and acting upon the conical valve 64 through a suitable linkage similar to the linkage described above which actuates the conical valve 15 and therefore will not be described in detail except that the conical valve 64 is returned to its seat due to its own weight causing it to drop down towards its seat as the roller 65 approaches a low place on the face of the cam 66. The intermediate partition 13 has riveted to its under side a lug 16 by means of rivets such as 24 and slidably mounted in lug 16 is the conical valve 68, the soft gasket 23 set in a groove in the surface of the conical valve 68 is held up against the lower side of the intermediate partition 13 by means of a spring 25 mounted concentrically about the stem of the conical valve 68 and between the base of the conical valve 68 and the lug 16. The lever 69 swiveled on the pin 70 in the bracket 71 which is riveted by means of rivets such as 72 to the outside of the cylindrical casing 10 extends inward and at its inner end is provided with a slot which engages with the pin 73 in the end of the stem of the conical valve 68 and at its outer end has journaled thereon a roller 65. A split pin 66 retains the roller 65 on the end of the lever 69. A cam 74 secured to the vertical cam shaft 34 by means of the set screws 75 acting upon the roller 65 raises the exterior end of the lever 69 and the interior end correspondingly being depressed the conical valve 68 is drawn upon by the slot in the end of the lever 69 engaging with the pin 73 in the end of the stem of the conical valve 68. The vertical cam shaft 34 has keyed on its lower end the worm gear 76 which meshes with the worm 77 on the end of the shaft of the driving motor 78 upon which motor 78 being supplied with electrical current the vertical cam shaft 34 will be set in rotation, the ratio of speeds of revolution of the vertical cam shaft 34 and that of the electric motor 78 is comparatively great, the degree of diversity of their rates of revolution depends upon the type of vegetable products being treated in the apparatus. The lower end of the cylindrical casing 10 is made square in cross section so as to receive the square screen frame 79 on which is stretched a screen 80. The screen frame 79 is mounted in the cylindrical casing 10 by means of a plurality of parallel supporting links such as 81, the upper ends of these links are swiveled on pins such as 82 in the screen frame 79 while their lower ends are swiveled on rods such as 83 passing entirely across and supported by passing through the sides of the cylindrical casing 10. A vibrator 84 which may be of the type to be operated by compressed air or electricity is fastened to the square screen frame 79 and as the vibrator 84 is the type which has no exterior moving parts and imparts movement to the apparatus to which it is attached by reason of the whole vibrator tending to vibrate whenever power is applied it is necessary to hold the square frame 79 with a reasonable clearance thereabout between it and the cylindrical casing 10 by means of a pair of springs such as 85, one end of which springs are hooked over pins 82 in the square screen frame 79 and their other ends are hooked over hooks such as 87 screwed into the walls of the cylindrical casing 10. The lower head 12 is shaped to act as a chute and slopes downward to the right conducting any matter which may pass through the screen 80 out from the apparatus to some suitable place where it may be readily disposed of. A chute 88 riveted to the outside surface of the cylindrical casing 10 by means of rivets such as 72 has its bottom parallel to and slightly above the screen 80 so that whenever a gust of air passing down through the pipe 94 is directed by a suitable aperture in the left hand wall of the cylindrical casing 10 across the top of the screen 80 it tends to blow loose chaff and shucks out through the aperture in the opposite wall of the cylindrical casing 10 under which aperture chute 88 is mounted and thence into the chute 88. The chamber formed between the intermediate partitions 14 and the upper head 11 has opening therein a pair of valves 89 and 90 mounted in suitable cages riveted to the exterior surface of the cylindrical casing 10 by rivets such as 72, the valve 89 serves as an exhaust valve and allows any air pressure which may be built up in the upper chamber by high pressure air being admitted by the valve 90, which valve 90 may be termed an inlet valve to escape. The exhaust valve 90 is opened by the cam 91 pressing against the roller 92 and is held closed by the spring 93. Valve actuating mechanisms of the various valves which serve to admit and release air from the various compartments in this apparatus are substantially the same, the only exception being that in the case of the valves which must be pulled open by pulling upon their stems, have the rollers which engage with the valve actuating cams mounted diametrically opposite from the position in which these rollers are mounted in the case of the valves which are opened by pushing against their stems.

The chamber formed between the intermediate partitions 13 and 14 is provided with two valves 95 and 96 controlling openings in the side of the cylindrical casing 10. These valves 95 and 96 are arranged one above the other and are operated by cams such as 91 on the vertical cam shaft 34. The upper valve 95, the function of which is to make connection between the vacuum tank 97 shown in Figure VII and the chamber formed between the two intermediate partitions 13 and 14, is arranged to open inwardly into said chamber, thus when the pressure in said chamber is greater than pressure in the vacuum tank 97, the difference in pressure will tend to hold the valve 95 firmly against its seat whenever cam 91 is in proper position, the valve 95 being mounted in a cage 98 which is riveted to the outside of the cylindrical casing 10 and communicates with the vacuum tank 97 by a suitable pipe 111 as shown in Figure VII. The lower valve 96 which is known as a vacuum breaker valve is mounted in a cage 99 riveted to the outside of the cylindrical casing 10 and is arranged to open outward so that when a state of reduced pressure exists in the chamber formed between the intermediate partitions 13 and 14, the higher atmospheric pressure exisiting outside the cylindrical casing 10 will tend to hold it against its seat whenever the cam 91 permits, the cage 99 is so arranged that whenever the valve 96 is opened by the cam 91 the atmospheric air will have free access to the cage and said valve. Springs such as 93 are provided to hold the valves in their closed positions. The various valves which admit and exhaust air from the interior of the cylindrical casing 10 are arranged so as to cause a minimum of disturbance to the vegetable products which may be contained therein. For instance, let us consider the valves 89 and 90 which serve to admit and exhaust air from the chamber between the intermediate partitions 11 and 14, valve 89 which is the pressure valve, is mounted in the side of the cylindrical casing 10 as close up to the upper head 11 as possible so that when it opens and permits the high pressure air which may be in the space between the partitions 11 and 14 to escape down through the pipe 94 the vegetable products which may be in this space also, will not be drawn into the current of air so produced. The valve 90 serving to admit high pressure air to the chamber between the partitions 11 and 14 does not have this difficulty of operation connected therewith as in the case of the pressure relief valve 89 if the air in entering through this valve tends to agitate the vegetable products contained in the space between the partitions 11 and 14 and thereby tends to facilitate the shucking process by reason of causing the vegetable products to come into violent contact with the walls of the cylindrical casing 10, thus breaking some of the shucks and hulls and there being no means of egress, none of the vegetable products will be able to get out of the space above mentioned and the pressure will build up to the extent to which it may be desired. The valves 95 and 96 which admit and exhaust air to the chamber contained between the intermediate partitions 13 and 14 are arranged in a similar manner to the valves 89 and 90, that is with the valve 95 which controls the exhausting of air from the chamber formed between the intermediate partitions 13 and 14 mounted as far up towards the top of this chamber as is possible so that as the air rushes out through said valve there will be the least tendency for the vegetable products which may be contained in said chamber from being picked up by the current of air so set up and carried along out of the chamber between the partitions 13 and 14 while the valve 96 which serves as a vacuum breaker and admits air to this chamber is arranged so that the incoming current of air will tend to agitate the contents or the vegetable products which may be contained in this chamber and by reason of the impact of the various units of the mass contained between the partitions 13 and 14 upon the walls of said chamber further the shucking operation. Turning now to Figure IV which shows in enlarged section a side elevation of the hopper 37, the hopper as shown is at the end of the feeding stroke that is with the feeding sector 39 at the upper end of its feeding stroke after having traveled upwardly in a circular path about the center of the shaft 42 as an axis until its upper end is in a position such that the vegetable products which may have been picked up therein during its passage upwardly through the mass of the vegetable products contained in the hopper 37 will readily fall out therefrom onto the top of the upper head 11 of the shucking apparatus shown in Figure I. The upper end of the feeding sector 39 is provided with a flap side 100 which swings about pin 101 which is secured in the sides of the feeding sector 39, the lower end of the flap 100 is provided with a lug 115 which as the flap swings inwardly in a clockwise direction from the position as shown in Figure IV so that it is in line with the left hand wall of the feeding sector 39, its inward motion will be arrested by this lug 115. As the circular sector 39 moves downwardly through the hopper 37 the mass of vegetable products contained in the above mentioned hopper will tend to force the flap 100 inwardly so that it is in line with the left hand wall of the feeding sector 39. Chute 102 may be arranged from any convenient point exterior to the shucking apparatus to conduct the vegetable products which it is desired to shuck to the hopper 37, the angle of this chute 102 is so arranged that vegetable products will slide freely therethrough and at all times keep the hopper 39 sufficiently filled to furnish a continuous supply of material to the shucking apparatus.

Figure V shows in enlarged scale the mechanism which operates the various valves which serve to admit and exhaust air from the cylindrical casing 10, the valve mechanism depicted happens to be that operating the valve which exhausts air from the cylindrical casing 10, such as valves 89 or 95. A roller guide 103 is slotted with the center line running the length of the slot parallel to the side thereof and the stud 104 which serves as a bearing for the roller 105 is screwed into the roller guide 103 in a suitable position so that as the vertical cam shaft 34 which passes through the above mentioned slot and carries the cam 91 revolves, the cam 91 mounted thereon will engage with the roller 105 and forcing it over to the right as shown in Figures V and VI will open the valve to which this mechanism may be connected by depressing the valve stem which is secured to the roller guide 103 by the pin 106. A spring such as 93 arranged concentrically about the valve stem and held in the state of compression between the top of the valve cage such as 98 and the end of the roller guide 103, holds the valve closed at all times when the cam 91 is not in contact with the roller 105. Turning now to Figure VII we have a cylindrical casing 10 having the pipe 110 leading to the valve cage around the valve 90 connected with the pressure storage tank 107 which is in turn connected to the compressor 108 by a suitable pipe 109. A vacuum tank 97 is connected by a suitable pipe 111 to the cage surrounding the valve 95 and to the vacuum pump 112 by the pipe 113.

The operation of the apparatus for shucking vegetable products is substantially as follows: Let us consider a charge of vegetable products to have been admitted to the chamber between the partitions 11 and 14 and having been subjected by air pressure therein for a reasonable period of time and is now ready to be moved on to undergo the next stage of the process of shucking. In order to open the intermediate valve 64 with a minimum effort it is essential that the high pressure in the chamber between the partitions 11 and 14 may be permitted to escape which is accomplished by the cam shaft 34 which is being revolved at a uniform rate by the motor 78, the cam 91 mounted thereon turning therewith, coming in engagement with the roller 92 which as it is forced away from the center of the vertical cam shaft 34 opens the valve 89 by pressing downwardly upon its stem, the valve 89 uncovering its port permits the air contained in it under high pressure from the chamber between the partitions 11 and 14 to rapidly escape to the pipe 94 and immediately thereafter the intermediate valve 64 is opened by the cam 66 which revolving with the vertical cam shaft 34 lifts the roller 65 and the end of the bell crank 28 whereon it is mounted. The roller 65 in rising and carrying the bell crank 28 with it revolves shaft 60 in its supports and the bell crank 22 pinned to the shaft 60 and in line with the intermediate valve 64 and moving therewith lifts the intermediate valve 64 through the linkage consisting of the links 20 and of the pins 19. Valve 64 in rising from its seat in the intermediate partition 14 permits the vegetable products which are heaped upon this partition to easily slide downward through the opening thus produced into the chamber between the partitions 11 and 14. The vertical cam shaft 34 still continuing to revolve, the cam 66 will revolve under the roller 65 and this cam being so proportioned that the proper time having been allowed for the vegetable products which would be contained in the chamber between the partitions 11 and 14 to entirely pass downward into the chamber below that, the intermediate valve 64 will return to its seat as the contour of the cam 66 permits the roller 65 and the end of the bell crank 28 upon which it is mounted to fall. The intermediate valve 64 now having returned to its seat and the vacuum breaking valve 96 being closed, the vacuum valve 95 will be opened by the cam 91 revolving with the vertical cam shaft 34 and a clear passage having been made with the vacuum tank 97, the air in the chamber between the partitions 11 and 14 will rush out through the valve cage 98 in the directions as shown by the arrows into the vacuum tank 37. Under the condition of a sudden transition from high pressure to very low pressure the shucks and shells of the vegetable products will split open due to the individual shucks thereof having been filled with air at high pressure while they were exposed thereto in the chamber between the partitions 11 and 14, being unable to endure the great difference in pressure which now exists that they are surrounded by a high vacuum. The bursting of the shucks and shells of the vegetable products which now takes place is readily facilitated by having them impinged upon some hard surface as they drop through the opening immediately surrounding the intermediate valve 64. The impact of the vegetable products against this surface would in conjunction with the internal pressure within the shucks tend to split some of them without the necessity of subjecting them to low pressure in the vacuum chamber. The vegetable products under treatment having been exposed to low pressure between the partitions 13 and 14 for a sufficient time as determined by the contour of the cam 91 which operates the vacuum valve 95 and by the speed of rotation of the vertical cam shaft 34, the vacuum valve 95 will be permitted to close under the urge of the spring 93 as the vertical cam shaft and the cam 91 mounted thereon continue to turn until the vacuum valve 95 is entirely closed. Immediately after the vacuum 95 is closed the vacuum breaker valve 96 will be opened by the further turning of the cam shaft 34 and will permit the access of the atmospheric air to the chamber between the partitions 13 and 14 thus destroying the vacuum that exists therein and bringing the pressure therein up to atmospheric. The pressure between the partitions 13 and 14 now having risen to atmospheric it is possible to open the discharge valve 68 with a moderate expenditure of power which is done by the vertical cam shaft 34 turning the cam 74 fastened thereon with the set screws 75 so that the hump on the cam engages with and raises the roller 65 which is journaled on the end of the lever 69. The end of the lever 69 whereon is mounted the roller 65 as it rises swings about the pin 70 as a pivot and the end of the lever 69 where it by reason of the slot in its end which engages with the pin 73 in the stem of the valve 68, moves downward drawing the valve 68 along with it. The valve 68 having entirely opened, the vegetable products in the chamber between the partitions 13 and 14 will now flow out through the opening thus formed and drop on to the screen 80. The screen 80 and the frame 79 over which it is stretched is at all times during the operation of the apparatus above described kept in a state of continual horizontal vibration by means of the electrically or pneumatically operated vibrator 84 which is rigidly riveted to the screen frame 79 by means of rivets such as 72, the cylindrical casing 10 being provided with an opening concentric with the vibrator 84 so that the screen frame 79 and the screen 80 stretched thereon together with the vibrator 84 are free to vibrate at will. In Figure I the screen frame 79 is shown mounted so as to be capable of vibration in a horizontal plane in one direction, that is left to right, but it is conceivable that for certain vegetable products a screen might more efficiently perform its function if it were mounted to vibrate in two directions in a horizontal plane. This result may be attained by suspending a screen frame such as 79 entirely by means of springs instead of by means of the links such as 81 and the bars such as 83 as shown in Figure II and providing a second vibrator mounted so that its line of vibration is at right angles to that of the line of vibration of the vibrator 84 shown in Figure I. The vegetable products having been deposited upon the screen 80 and the kernels having been liberated from their shucks as above described, they will fall through the screen 80 providing the screen 80 has been provided with a suitable mesh to pass the kernels of the vegetable products which are being shucked. The portion of the shucks which are equal to or less in size than the mesh of the screen 80 will consequently pass through it falling down on to the lower head 12 along with the kernels of the food products and passing out from the cylindrical casing 10 through the chute 114 are ready for a further winnowing process to remove the small portion of shucks mixed in with them which operation is beyond the scope of this apparatus and will not therefore be described.

When the vegetable products and their shucks fall on to the vibrating screen 80 the vibration thereof will cause the kernels of the vegetable products to collect at the bottom of the pile due to their greater weight while the large and fluffy fragments of the shucks will collect on top of the pile of kernels in which position the shucks are readily blown out through the chute 88 by a gust of high pressure air which is liberated from the chamber between the upper head 11 and the partition 14 by the exhaust valve 89 opening to relieve the pressure therein and the pressure so released escapes downward through the pipe 94 and entering the chamber between the lower head 12 and the intermediate partition 13 blows the shucks in its path from the chamber out through the chute 88.

The chamber between the partitions 13 and 14 having been entirely cleared of vegetable products which were being treated therein the conical valve 68 will be returned to its seat by the spring 24 pressing against its bottom, the continued rotation of the vertical cam shaft 34 and the cam 74 mounted thereon permitting the roller 65 mounted on the end of the lever 69 to descend and the other end of the lever 69 engaging with the pin 73 in the end of the stem of the conical valve 68 to rise thus permitting the conical valve 68 to entirely return to its seat and pressing the soft gasket 23 firmly up against the bottom of the partition 13 making an absolutely air-tight joint. The conical valve 68 being entirely closed and the vacuum breaker valve 96 being open and the valve 95 closed, the chamber between the partitions 13 and 14 is now ready to receive a fresh supply of vegetable products which will be admitted thereto by the opening of the conical valve 64 in the intermediate partition 14 as above described. As soon as the conical valve 64 has been thoroughly seated as described above, the chamber between the upper head 11 and the intermediate partition 14 is ready to receive the charge of vegetable products to be subjected to external pressure, the vegetable products being admitted thereto by the vertical cam shaft 34 turning and by its rotation depressing the roller 29 mounted on the stud 30 screwed into the end of the bell crank 28 which is mounted on the rocking shaft 21 by reason of the cam 55 secured to the vertical cam shaft 34 by the set screw 56, turning so that the hump thereon comes into contact with the roller 29. The rocking shaft 21 having been caused to rotate by the cam 55 depressing the roller 29, it depresses the conical valve 15 by the end of the bell crank 20 pinned thereon by the pin 22 engaging with the stem 17 of the conical valve 15 through the links 20 and the pins 19 passing therethrough and the ends of the bell crank 20 and the stem 17 of the conical valve 15. The conical valve 15 in descending from its seat in the upper head 11 compresses the spring 25 mounted concentrically about the stem of the conical valve 15 and between the bottom of the valve 15 and the lug 16. At approximately the same time as the conical valve 15 commences to leave its seat a charge of vegetable products to be shucked is dropped into the top of the cylindrical casing 10 upon the upper head 11, the momentum of the vegetable products as they fall from the feeding sector 39 of the automatic hopper feed 37 tends to facilitate their passing through the opening in the upper head 11 left by the opening of the conical valve 15 as it opens thus insuring the entrance of the vegetable products to be shucked to the chamber formed between the upper head 11 and the intermediate partition 14 with the minimum requirement as to time for the operation. The charge of vegetable products having entirely passed through the opening around the conical valve 15 the conical valve 15 will now be permitted to return to its seat in the bottom of the upper head 11 by the continued rotation of the vertical cam shaft 34 and the cam 55 secured thereon by the set screw 56, which in turning permits the roller 29 mounted on the stud 30 in the end of the bell crank 28 to rise as the hump of the cam passed from under the roller 29 thus permitting the rocking shaft 21 to turn under the impulse of the spring 25 re-acting against the lug 16 and the bottom of the conical valve 15, forcing the conical valve 15 upward towards its seat and forcing upward the end of the bell crank 28 connected to the stem 17 of the conical valve 15 by the links 20 and the pins 19 passing through the ends of the links 20 and the adjacent ends of the bell crank 28 and the stem 17 of the conical valve 15. The soft gasket 23 is firmly pressed up against the bottom of the upper head 11 by the conical valve 15 under the pressure of the spring 25. The cam 55 is made with a cam surface on its upper and lower ends. The lower cam surface actuates the conical valve 59 as above described, while the upper cam surface actuates the feeding sector of the automatic hopper feed 37 which is accomplished by the cam surface of the upper end of the cam 55 engaging with the roller 53 which is journaled on the stud 54, which is screwed into the end of one of the arms of the bell crank 48, which bell crank 48 is journaled on pin 50 pressed into the lug 51, the other end of the bell crank 48 is connected to the link 46 by means of a pin 49 and suitable split pins such as 66 holding the pin 49 in place. The other end of the link 46 fits over a stud 47 in the end of the bell crank 44. As the hump on the upper end of the cam 55 moves out from under the roller 53 permitting it to descend under the urge of the spring 57 pulling upon the pin 59 in the bell crank 48, it will be seen that the bell crank 48 will rotate anti-clockwise about the pin 50 and through the connecting linkage just described will cause a similar anti-clockwise rotation of the shaft 42 on which the crank 45 is pinned by means of the pin 43. The effective lengths of the arms of the bell crank 48 and that of the crank 45 are so proportioned that a small movement of the roller 53 will cause a considerable degree of rotation of the shaft 42. The shaft 42 in rotating in an anti-clockwise direction will cause the arm 40 pinned thereon by the pin 42 to move in an anti-clockwise direction also and with the apparatus in the position as shown in Figure I the end of the arm 40 with the feeding sector 39 riveted thereto will rise pushing the feeding sector 39 up through the mass of vegetable products in the hopper 37 thus carrying the quantity of the vegetable products which is contained in the upper end of the sector 39 and swinging over to the left in a circular path in the direction as shown by the arrows in Figure IV deposits the quantity of vegetable products contained in the upper end of the feeding sector 39 which constitutes a working charge for the shucking apparatus, onto the upper head 11 of the cylindrical casing 10. As the vertical cam shaft 34 continues to turn, the hump on the cam 55 will engage with the roller 53 lifting it and actuating the linkage connected thereto and the reverse of the movements as above described will cause the shaft 42 to rotate in a clockwise direction returning the feeding sector 39 down to the position as shown in Figure I. The various cams on the vertical cam shaft 34 actuating the various valves and feeding devices are so proportioned that the most efficient use of the various parts of the apparatus is obtained and all parts of the apparatus are as nearly as possible at the same time working on the shucking of the vegetable products which are being fed to the machine.

As various changes might be made in the illustrative apparatus above described and in the art herein set forth, it is to be understood that all matter herein set forth or shown in the accompanying drawings is to be interpreted as illustrative and not in a limiting sense.

It is also to be noted that it is obvious that various other gaseous fluids than ordinary atmospheric air may be used in this invention, and the term "air" is accordingly used throughout in a broad sense but is not to be interpreted so broadly as to include vapors generated by the heating and evaporation of a constituent of the material acted upon.

I claim—

1. The herein described art of removing the outer shucks from vegetable products which consists in subjecting them to a sudden diminution of exterior pressure with respect to the air pressure inside the outer shuck.

2. The herein described art of removing the outer shucks from vegetable products which consists in subjecting them to air pressure above atmosphere for such time as to permit the air pressure within the outer shuck to be substantially increased by transmission through the outer shuck and thereafter subjecting the products to a sudden diminution of exterior pressure.

3. The herein described art of removing the outer shucks from vegetable products which consists in raising the air pressure within the outer shucks by transmission therethrough without substantially raising the pressure in the inner portions and substantially diminishing the pressure outside the outer shucks.

4. The herein described art of removing the outer shucks from vegetable products which consists in subjecting them to a sudden diminution of pressure with respect to the air pressure inside the outer shuck without evaporation of constituents of the products and thereafter subjecting the products to simultaneous vibration and screening.

5. The herein described art of removing the outer shucks from vegetable products which consists in subjecting them to a sudden diminution of pressure with respect to the air pressure inside the outer shuck and thereafter subjecting the products to a current of air to remove the shucks.

6. The herein described art of removing the outer shucks from vegetable products which consists in subjecting them to a sudden diminution of pressure and thus breaking open the outer shucks, supporting the products in such condition upon a screen and forcing air downwardly through the screen to tend to draw the inner portions of the products through the screen.

7. In apparatus for removing the outer shucks from vegetable products, in combination, means adapted to confine the products and means adapted to suddenly reduce the air pressure within the space in which they are confined below the air pressure within said outer shucks.

8. In apparatus for removing the outer shucks from vegetable products, in combination, means adapted to confine the products and means adapted to suddenly reduce the air pressure without substantial heating within the space in which they are confined, the pressure in the confined space being reduced substantially below atmosphere.

9. In apparatus for removing the outer shucks from vegetable products, in combination, a receptacle adapted to confine the products, means adapted to increase the air pressure within said receptacle to such pressure as to cause the air to penetrate said outer shucks and means adapted thereafter suddenly to reduce said pressure.

10. In apparatus for removing the outer shucks from vegetable products, in combination, means adapted to confine the products, means adapted to raise the pressure upon the confined products to cause the air to penetrate said outer shucks and substantially above atmosphere, and means adapted to reduce said pressure substantially below atmosphere.

11. In apparatus for removing the outer shucks from vegetable products, in combination, means adapted suddenly to reduce the air pressure surrounding said products with respect to that inside their outer shucks and thereby break open their outer shucks, a screen adapted to receive the products with their shucks broken, and means adapted to vibrate the screen.

12. In apparatus for removing the outer shucks from vegetable products, in combination, means adapted suddenly to reduce the outer pressure to which said products are subjected with respect to the air pressure within their shucks and means adapted to receive the products with their shucks exploded and means connected with said first mentioned means adapted to subject the products to a current of air to separate their shucks from their inner portions.

13. In apparatus for removing the outer shucks from vegetable products, in combination, a receptacle adapted to contain the products, means adapted to suddenly reduce the air pressure within said receptacle with respect to that within the outer shucks of said products, a screen upon which said products are led by gravity from said receptacle with their outer shucks exploded, and means adapted to co-act with said screen in separating the outer shucks from the inner portions.

14. The herein described art of preparing vegetable products for the breaking of their outer shucks which consists in subjecting them to external air pressure until a substantial increase of air pressure within their outer shucks has been attained by transmission through said outer shucks.

15. In apparatus for removing the outer shucks of vegetable products, in combination, a receptacle adapted to receive the products, automatic means for delivering said products thereto, means adapted to suddenly reduce the air pressure within said receptacle with respect to that within the outer shucks of said products to explode said shucks, and automatic means for removing said shucks and said vegetables from said receptacle.

16. In apparatus for removing the outer shucks from vegetable products, in combination, a receptacle adapted to contain the products and means associated with said receptacle adapted automatically to intermittently subject said vegetables to an increase in pressure such as will cause the surrounding fluid to pass through said outer shucks and to a sudden decrease in pressure to explode their shucks.

Signed at Stamford, in the county of Fairfield and State of Connecticut, this 30th day of April, A. D. 1921.

ROBERT S. BLAIR.